Patented Nov. 7, 1944

2,361,986

UNITED STATES PATENT OFFICE 2,361,986

COMPOSITE PIGMENTS AND PROCESS OF PRODUCING SAME

James E. Booge, Wilmington, Del., assignor to E. I. du Pont de Nemours & Company, Wilmington, Del., a corporation of Delaware No Drawing. Application May 1, 1941, Serial No. 391,313

7 Claims. (Cl. 106—300)

This invention relates to the production of composite titanium pigments. More particularly, it relates to the production of composite pigments comprising titanium dioxide and precipitated calcium carbonate.

Extended titanium pigments are well known in the art and are available in different forms. It is possible to obtain products comprising titanium dioxide which are extended with barium sulfate, calcium sulfate, and fibrous magnesium silicate. Attempts have been made to produce pigments extended with other extenders, particularly calcium carbonate, but the properties of the pigments heretofore obtainable have not been satisfactory for the paint industry. The natural calcium carbonate which has been finely ground by dry or wet methods is definitely low in oil absorption, and the settling properties unsatisfactory for a pigment material. The color is also deficient. The precipitated calcium carbonates heretofore available, likewise, are deficient in paint properties and have not been found competitive with other extender materials, particularly precipitated barium sulfate and the anhydrite form of calcium sulfate.

Various investigators have endeavored to produce calcium carbonate extended pigments which are competitive with the above mentioned extended pigments. The prior art efforts are well summarized in U. S. Patent 2,170,800. This particular patent proposes a method for overcoming the recognized difficulties and is directed to a process for producing calcium carbonate in a heretofore unknown physical condition. The process is somewhat expensive because of the indirect method for the manufacture of the calcium carbonate material and the properties of the resulting composite do not compare favorably with competitive composite pigments comprising other extender materials.

The various proposed methods for the production of extended titanium pigments may be summarized as follows:

1. The extender material is suspended within a titanium salt solution and the salt is then hydrolyzed to form the composite which is separated from the mother liquor and subjected to calcination.

2. An extender material is intimately associated with a titanium oxide precipitated material in proper proportions and the mixture is then subjected to calcination.

3. Calcined titanium dioxide is blended with an extender material in the proper proportions with or without high temperature heat treatment.

4. The calcium sulfate base titanium pigment is digested with an alkali carbonate solution, thereby transforming the calcium sulfate into calcium carbonate.

Methods 1 and 2 above are impossible for use in the production of calcium carbonate containing extended pigments. This is due to the fact that calcium carbonate decomposes at a temperature far below that necessary to develop pigment properties of titanium dioxide. Method 3 has not been found useful due to the absence of a satisfactory calcium carbonate extender material in the industry. The 4th method has not been exploited commercially for two reasons. Calcium carbonate would be substantially more costly than a similar calcium sulfate extended pigment, since it is first necessary to produce the latter and then convert it by the use of further chemicals to the carbonate. Additionally, the product is bound to contain calcium sulfate as an impurity due to its method of manufacture and this is a disadvantage for its application in exterior paints. Furthermore, the calcium carbonate component of the pigment is not present in its most desirable physical form since it retains the external form of the original calcium sulfate and is pseudomorphic therewith.

"Oil absorption" is a value describing the amount of linseed oil necessary to just wet a certain quantity of pigment according to a given procedure. The method used in this work is essentially the same as the Standard rub out method described on page 209 of the 9th edition (1939) of the Physical and Chemical Examination of Paints, Varnishes, Lacquers, and Colors by H. A. Gardner. The figures reported in this description of invention indicate the number of grams of oil necessary to just wet 100 grams of pigment material which in this case is the dried calcium carbonate-titanium oxide composite.

"Tinting strength" is a measure of the effectiveness of a white pigment in covering or lightening the tint of a colored pigment mixed with it. A commercial blended white pigment containing 70% of $CaSO_4$ and 30% of $TiO_2$ was chosen as a standard of comparison for these tests and was arbitrarily assigned the tinting strength value of 203. The method used for determining tinting strength is described on page 34 of the 9th (1939) edition of the Physical and Chemical Examination of Paints, Varnishes, and Colors by H. A. Gardner.

"Specific surface area" is a measure of particle size of a pigment material. It is conveniently determined by the method outlined by Professor Emmett of The Johns Hopkins University in the January 15, 1941, Analytical edition issue of Industrial and Engineering Chemistry. This method depends on absorption of gas on the pigment surface and is believed to be sufficiently reliable to identify pigment materials. The surface area of a component of a mixed pigment is easily determined by this method by determining the surface area of one of the components and also the composite and from the data, specific area of the other component may be calculated. In the case of calcium carbonate titanium dioxide pigments, it is possible to use this method. The specific area of the titanium dioxide is measured prior to its use in making the composite pigment and then the surface area of the composite pigment is determined. The resulting data along with the pigment analysis allows one to calculate the surface area of the calcium carbonate component.

"Particle size distribution" data for calcium carbonate is conveniently obtained by elutriation methods. These methods depend on a consideration of Stokes' law and are well described in the scientific literature.

This invention has as an object the production of a composite titanium pigment containing calcium carbonate possessing tinting and hiding power properties equivalent to those found in composite pigments containing other extender materials. A further object is the production of calcium carbonate pigment substantially free of soluble calcium salts and suitable for general use in exterior paints. A further object is the manufacture of a calcium carbonate base pigment of selected particle size and particle size distribution, and whose particles are present as discrete calcite crystals. Other objects include the manufacture of a calcium base titanium dioxide pigment from titanium dioxide and the inexpensive chemicals, lime and carbonic acid. Additional objects will become apparent from an examination of the following description and claims.

These objects are obtained by a process which comprises reacting calcium hydroxide and carbonic acid in the presence of a suspended titanium pigment.

In a more restricted embodiment this invention comprises the interaction of a lime slurry containing suspended calcined titanium dioxide and carbon dioxide, and completing said reaction until substantially complete carbonation of the calcium hydroxide takes place.

The preferred embodiment of this invention comprises simultaneously adding a suspension of calcium hydroxide and calcined titanium dioxide along with carbonic acid to a suitable reaction chamber and maintaining substantially constant pH conditions, not exceeding about 11, within the reaction vessel, and withdrawing the composite titanium dioxide calcium carbonate pigment material therefrom.

This invention may be more readily understood from an examination of the following examples which are given for illustrative purposes and are not intended to place any restriction or limitation on the herein described invention. Some of the examples which follow are directed to the production of calcium carbonate base titanium pigments made according to prior art processes in order that a comparison can be made between these products and products made according to my invention.

*Example 1*

30 parts of finely ground calcined titanium dioxide was added to a slurry containing 52 parts of calcium hydroxide substantially free of coarse particles, and 600 parts by weight of water. After thorough incorporation of the titanium dioxide, carbon dioxide was added until complete carbonation was obtained or until a pH value of about 9.0 was obtained. The resulting slurry was then filtered, dried and analyzed for $TiO_2$. It was found to contain 30.0% $TiO_2$.

*Example 2*

Example 1 was repeated except that the calcium hydroxide was continuously carbonated in a reaction chamber by the simultaneous addition of the slurry along with carbon dioxide in an equavelent amount to an absorption tower. The pH of the reaction chamber was maintained at about 9 during the carbonation. This pigment was likewise dried and analyzed for $TiO_2$. A figure of 29.9% of $TiO_2$ was found.

*Example 3*

100 parts of a standard calcium sulfate base titanium pigment was slurried in water along with 25 parts of pigment quality anhydrite calcium sulfate prepared by the process disclosed in U. S. Patent 2,151,339. This slurry was then digested with a slight excess of sodium carbonate solution, thereby converting the calcium sulfate to calcium carbonate. The latter remaining in a physical form, which is pseudomorphic with the original calcium sulfate. The resulting sodium sulfate solution was removed by filtration and washing, and the pigment after drying was analyzed and tested.

*Example 4*

Calcium carbonate was precipitated by the well known batch carbonation method with lime slurry and carbonic acid as the reagents. This operation is well understood in the prior art, and the resulting suspension was wet blended with $TiO_2$ in sufficient amount to give a 30% $TiO_2$, 70% $CaCO_3$ mixture. The resulting suspension was filtered, dried and tested.

*Example 5*

The preceding example was repeated using a similar lime slurry but combining the calcium hydroxide and carbonic acid in a continuous operation. The lime and carbonic acid were simultaneously admitted to the reaction chamber and the pH maintained between 8.5 and 9.0. The resulting calcium carbonate suspension was then wet blended with $TiO_2$ as in the previous example.

*Example 6*

Calcium carbonate was prepared by a metathetical reaction using calcium chloride and sodium carbonate as the reactants. The resulting $CaCO_3$ was separated from the salt solution by filtration and washing operations after which it was blended with a sufficient amount of $TiO_2$ to give a 30% $TiO_2$, 70% $CaCO_3$ mixture. This pigment was likewise prepared for physical tests.

The pigments resulting from the above examples were tested for $TiO_2$ content, for specific surface area of the calcium carbonate ingredient, for oil absorption, and tinting strength. The resulting data, along with similar data for commerial titanium dioxide-calcium sulfate and titanium dioxide-barium sulfate pigments are given in the table below:

Table

| Exp. No. | Per cent $TiO_2$ | Sp. area of $CaCO_3$ | O. A. | TS |
| --- | --- | --- | --- | --- |
| 1 | 30.0 | 19.2 | 19.3 | 209 |
| 2 | 29.9 | 8.1 | 12.5 | 206 |
| 3 | 30.1 | 25.0 | 20.5 | 179 |
| 4 | 30.0 | 31.9 | 22.6 | 185 |
| 5 | 30.0 | 1.16 | 8.7 | 176 |
| 6 | 30.0 | 3.78 | 16.7 | 179 |
| $TiO_2$-$CaSO_4$ | 30.1 | | 18.2 | 208 |
| $TiO_2$-$BaSO_4$ | 30.2 | | 12.8 | 201 |

An examination of the above data shows the tinting strength of the calcium carbonate pigment to be substantially higher when prepared in accordance with my present invention, and as exemplified by Examples 1 and 2 inclusive. The products resulting from Examples 4 to 6 are definitely lower in tinting strength properties as well as hiding power by comparison with the products from the preceding examples and also by comparison with commercially available calcium sulfate base pigments, and barium sulfate base pigments. It is also to be observed that the specific area of the calcium carbonate present in the products of my invention lie intermediate between products of the prior art. Products 3 and 4 have higher specific surface area and higher oil absorption with lower tinting strength. Products 5 and 6 are coarser materials possessing lower oil absorption and are also deficient in tinting strength.

The results of my research have led me to believe that the presence of titanium dioxide pigment in the lime slurry during carbonation substantially affects the properties of the resulting calcium carbonate. Titanium dioxide pigment is thought to be made up of somewhat porous particles and is also somewhat reactive towards alkalies and alkaline earth hydroxides. This affinity of calcium hydroxide for titanium dioxide, along with the porosity of the particle of the latter, seems responsible for the quality of the resulting calcium carbonate pigment.

I find it advantageous to prepare the titanium dioxide lime suspension in advance of its use. It is believed that the aging of this suspension allows the calcium hydroxide to become properly distributed or associated with the titanium dioxide, due to the affinity of the basic calcium hydroxide for the more neutral titanium dioxide. This modification of lime slurry by the presence of titanium dioxide pigment has been found to be well taken care of after aging of about 2 hours, although I prefer to hold the composite suspension for a period not less than about 10 hours before carbonation.

An examination of my composite or extended pigment reveals that it is superior in tinting strength and other paint properties, particularly consistency and oil absorption, which are due to the physical condition of the calcium carbonate which it contains. The specific area of the calcium carbonate ingredient is between about 5 and about 20 square meters/gram and the oil absorption of the product is between about 12 and about 20. With these properties one is able to obtain a composite pigment having a tinting strength approximately equal to that of standard commercial composite pigments containing other extenders.

The calcium carbonate component of my composite pigment produced according to my herein described invention has a particle size distribution of less than 50% greater than 3 microns, less than 6% greater than 6 microns, and less than 0.5% greater than 12 microns. Further, it has a specific surface area between about 5 and about 20 square meters/gram.

When practicing my novel precipitation process, I find that the amount of calcium oxide present in the suspension can be varied between the rather wide limits, but at no time should it be present to a greater extent than about 2 parts CaO per part by weight $TiO_2$. It appears that beyond this point the $TiO_2$ does not exert sufficient influence on the precipitation of the calcium carbonate. Smaller amounts of CaO per part of $TiO_2$ may be used and the ratio may be set at the pleasure of the operator. The pigment art prefers a pigment containing from about 15% to about 40% $TiO_2$ and the above disclosed process is well suited for the production of the same.

The composite pigment resulting from my novel process also possesses novelty. The process provides for a product equal in tinting strength to prior art titanium pigments containing satisfactory extenders and combined with acceptable working properties, particularly consistency. This combination has not been heretofore obtained. The crystal form of the $TiO_2$ is not critical and it may be either anatase or rutile. The latter has been found to give the highest quality composite $CaCO_3$ pigment.

In addition to the particle size distribution which differentiates my composite pigment over the prior art, I find it to be especially free of soluble salts, particularly calcium sulfate and soluble chlorides. This is to be expected since I have been able to produce this superior product by the use of inexpensive ingredients, namely, calcium hydroxide and carbon dioxide. An examination of the product shows it to be composed of small discrete particles of calcium carbonate possessing the crystal structure of calcite. It appears that these well formed discrete crystals are in large measure responsible for the excellent flow properties of the resulting composite pigment, and in particular contrast to the calcium carbonate of the prior art wihch gives to the paint a ropy consistency making the pigment material completely unacceptable in the paint industry.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. An improved titanium oxide-calcium carbonate composite pigment, free of soluble salts and the calcium carbonate content thereof consisting of small, discrete calcite crystals and being characterized by having a specific surface area of between about 5 and 20 square meters per gram, and an oil absorption value between about 12 and about 20.

2. An improved soluble salt-free composite titanium oxide pigment comprising calcined titanium dioxide of the rutile crystal form and preciptated, small, discrete, calcite crystalline calcium carbonate having a specific surface area of between about 5 and 20 square meters per gram, a particle size distribution of less than 50% greater than 3 microns, less than 6% greater than 6 microns and less than 0.5% greater than 12 microns, and an oil absorption value between about 12 and about 20.

3. A process for the production of a composite calcium carbonate-titanium oxide pigment which comprises the carbonation of calcium hydroxide while in intimate association with calcined titanium oxide pigment.

4. A process for producing an improved composite $TiO_2$-calcium carbonate pigment which comprises suspending a previously calcined titanium oxide pigment in a lime slurry, thence carbonating said lime to precipitate calcium carbonate on said suspended pigment and recovering the resulting pigment product.

5. A process for producing an improved composite $TiO_2$-calcium carbonate pigment which comprises suspending a previously calcined titanium oxide pigment in a lime slurry, introducing an equivalent amount of carbon dioxide into the resulting suspension to react with said lime and precipitate calcium carbonate on said suspended pigment, and then recovering and drying the resulting composite pigment.

6. A process for producing an improved composite $TiO_2$-calcium carbonate pigment which comprises suspending a previously calcined titanium oxide pigment in a lime slurry, permitting the resulting suspension to age for a short period of time and then simultaneously introducing the resulting suspension together with an equivalent amount of carbon dioxide into a reaction zone wherein said carbon dioxide and lime react to precipitate calcium carbonate on said suspended $TiO_2$ pigment, and then recovering the resulting pigment product.

7. A process for producing an improved composite $TiO_2$-calcium carbonate pigment which comprises suspending a previously calcined titanium oxide pigment in a lime slurry, employing an amount of calcium oxide in the suspension not greater than about 2 parts CaO per part by weight of titanium oxide, aging the resulting suspension for a short period of time, and then simultaneously introducing the aged suspension together with an equivalent amount of carbon dioxide into a reaction zone wherein said lime and carbon dioxide react to precipitate calcium carbonate on said suspended $TiO_2$ pigment, and then filtering, drying and recovering the resulting composite pigment.

JAMES E. BOOGE.